ROTATING LOOP HALF-TONE REPRODUCTION

Original Filed Dec. 27, 1971

ROTATING LOOP HALF-TONE REPRODUCTION

Original Filed Dec. 27, 1971 4 Sheets-Sheet 3

United States Patent Office

Re. 28,255
Reissued Nov. 26, 1974

28,255

ROTATING LOOP HALF-TONE REPRODUCTION

John E. Aughton, London, England, assignor to Crosfield Electronics Limited, London, England Original No. 3,737,225, dated June 5, 1973, Ser. No. 212,434, Dec. 27, 1971. Application for reissue Sept. 4, 1973, Ser. No. 394,274
Claims priority, application Great Britain, Jan. 6, 1971, 692/71
Int. Cl. G03b *27/48*
U.S. Cl. 355—48 5 Claims

Matter enclosed in heavy brackets [ ] appears in the original patent but forms no part of this reissue specification; matter printed in italics indicates the additions made by reissue.

ABSTRACT OF THE DISCLOSURE

An image reproduction apparatus employing a scanning light spot to expose a light-sensitive sheet, a half-tone image is produced by moving a light-transmitting half-tone screen element through the light path between the light source and the light-sensitive sheet at a point in the light path conjugate with the light spot on the sheet. In this way an image of the moving screen element, which may be a rotating loop of film, is formed at the light-sensitive surface.

The usual method for producing half-tone images consists in exposing a suitable light-sensitive film (for example a lithographic film) through a half-tone screen, for example by superposing a negative image, the half-tone screen and the light-sensitive sheet for contact printing. The density characteristics of the screen and the sensitivity of the film are such that each element of the image is reproduced as a dot on the light-sensitive sheet, the density of the dots being constant but the area or "percentage" of each dot varying as a function of the density of the corresponding element of the image negative. Half-tone screens are expensive and for color printing there is required either a set of half-tone screens with lines running at carefully selected angles or a single circular screen capable of being indexed to the selected screen angles, as otherwise the dots of different screens combine to produce a "moire" pattern which may be very noticeable. If a black printer is used in addition to the three color printers, the screen angles are generally 0°, 15°, 45° and 75°.

In some forms of image reproducer, the image to be reproduced is scanned by a photo-electric device which generates electric signals varying in amplitude with the density of the scanned elements. In color reproducing apparatus of this kind, the scanner also analyzes the light into its color components and the resulting electric signals from the photo-electric devices represent by their variations the densities of the corresponding color components of the scanned elements. With such apparatus color correction and tone correction can be effected by electrical mixing of the signals and the corrected signals can then be used to modulate a light source which exposes a light-sensitive sheet which is to be used in the preparation of a printer for the color component in question. Half-tone reproductions were produced by placing a half-tone screen in contact with the light-sensitive sheet.

According the present invention in apparatus having means for obtaining relative motion between a light-sensitive sheet and a light spot derived from a light source, to expose the sheet element by element to the light spot, and means for modulating the light spot in accordance with tonal values of successively scanned elements of an image to be reproduced on the light-sensitive sheet, we provide means for moving a light-transmitting half-tone screen element through the light path between the light source and the light-sensitive sheet at a point in the light path conjugate with the light spot on the light-sensitive sheet, so that an image of the moving screen element is formed by the light spot at the light-sensitive surface, the movement of the screen element through the light path being synchronized with the movement of the light spot over the light-sensitive sheet. Thus, it can be arranged that the half-tone screen element moves across the aerial image of an aperture in the optical system or that an aerial image of the half-tone screen pattern moves across the aperture itself. The light which reaches the light-sensitive sheet is modulated in two different senses, being time-modulated in accordance with the tonal values of the image to be reproduced and spatially modulated by the screen element.

If the light-sensitive sheet has a suitable characteristic, the required half-tone image is produced when the sheet is developed. The light-transmitting half-tone screen element may be one of a series of elements on a film loop which is fed continuously across the light path. The enlargement of the screen elements on this film loop depends upon the characteristics of the optical system.

The invention utilizes the observation that if a set of equally spaced parallel lines is drawn at any angle to the ruling on a screen pattern, by varying the pitch, i.e., the spacing between these equally spaced parallel lines it can be arranged that the screen pattern is split up into identical strips, assuming that the screen stretches to infinity in all directions. This will be explained more fully later in this specification.

In one form of scanner, the image to be analyzed and the light-sensitive sheet to be exposed are placed around the periphery of a rotating drum, axially spaced from one another. The drum is rotated and the analyzing and exposing heads of the scanning apparatus are moved slowly parallel to the drum axis so that each scanning head traces out a helical path on the drum. With such an arrangement, for a given angle the whole screen pattern can be built up from a repeated unit half-tone screen cell and can thus be reproduced from a single continuous loop of pattern of the same width and length equal to an integral multiple of repeating lengths.

With such an arrangement the user will not require expensive sets of complete screens and there is no need for a screen to be physically located over the light-sensitive layer each time a separation is made. In addition, there is no need for a vacuum contact system between the screen and the light-sensitive layer.

It will be appreciated that it is necessary to use a suitable relative traverse rate between the film loop and the light sensitive sheet to produce a required screen pattern and that adjacent scanning lines must be correctly phased.

In order that the invention will be better understood, two examples will now be described with reference to the accompanying drawings, in which.

Figure 1:
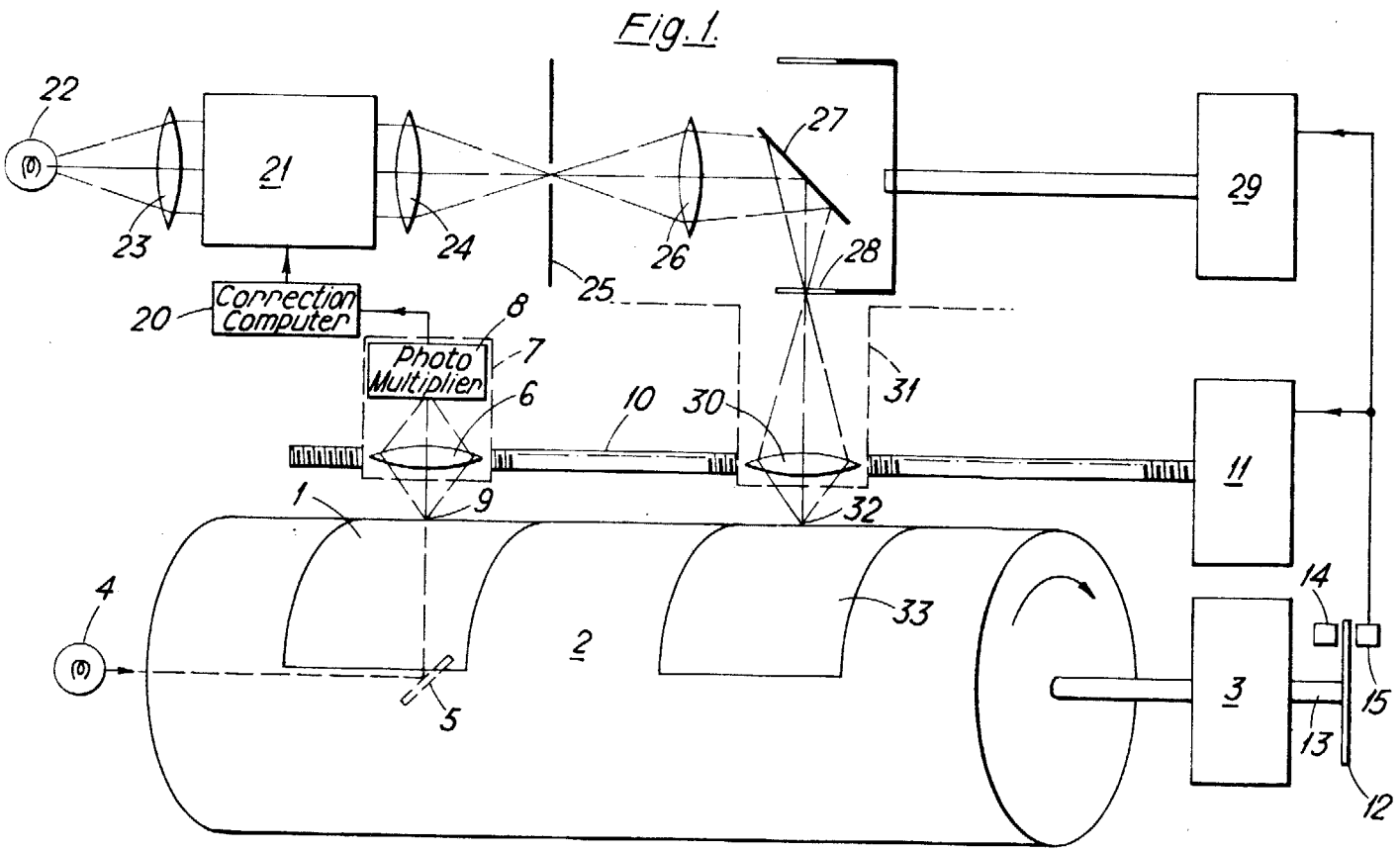
FIG. 1 illustrates an image reproduction system embodying the invention.

In FIG. 1, a transparency 1 to be reproduced is wrapped around the transparent surface of a drum 2 rotated by a motor 3. A light source 4 (the analyzing light source) illuminates the transparency 1 by way of a mirror 5 placed at 45° to the light beam, within the drum 2. Light passing through a spot on the drum and through the transparency element above this spot is received by a lens 6 in an analyzing head 7 and is focused on to a photomultiplier 8 which provides a corresponding electric signal. As the drum rotates the spot 9 traces a circumferential path around the drum and therefore around the curved transparency 1. The analyzing head 7 is mounted on a lead screw 10 rotated by a motor 11 so that in the course of a drum revolution the analyzing head moves parallel to the drum axis. As a consequence the spot 9 traces a helical path around the drum surface and the transparency is scanned in a number of side-by-side lines, the pitch being governed by the movement of the analyzing head along the lead screw in 1 revolution. The mirror 5 is attached to the analyzing head and moves with it. The motor 11 is phase-locked to the motor 3. This is effected by means of a disc 12 mounted on the driven shaft 13 and having a ring of peripheral apertures, a light source 14 on one side of the disc and a photoelectric device 15 on the other side of the disc which receives light through the apertures and generates a train of pulses having a frequency governed by the rotational speed of the drum. These pulses control the rate of rotation of the motor 15.

The signal from the photomultiplier 8 thus represents the tonal values of successively scanned elements of the transparency 1. This signal is applied to a correction computer 20, which can be of known design, and the corrected signal is applied as a modulating signal to a light modulator 21. This may be a Pockell cell crystal employing the longitudinal electro-optic effect.

The light modulator 21 receives light from a reproducing light source 22 through a collecting lens 23. A lens 24 concentrates the modulated light on to an adjustable aperture 25 and thence on to a lens 26. A mirror 27, arranged at 45° to the axis of the incident beam, reflects the light on to a screen loop 28 constituted by a strip, of the form shown in FIG. 2 or 3, formed into a circle. In a typical example there are 1,000 screen elements in a screen loop, the enlargement of the screen elements being less than that depicted in FIGS. 2 and 3. The scren loop 28 is driven in rotation by a motor 29 which is also phase-locked to the motor 3 by means of the components 12 to 15.

The arrangement is such that an aerial image of the aperture 25 is formed in the plane of the portion of the screen loop 28 through which the beam passes. Consequently, light passing through the screen loop carries the modulation imposed by the output of the correction computer as well as the modulation imposed by the screen loop. This light falls on a final lens 30 in an exposing head 31 also mounted on the lead screw 10 and therefore moving axially at the same speed as the analyzing head 7. The lens 30 focuses the light to a spot 32 on a light-sensitive sheet 33 wrapped around the drum 2. The spot 32 scans the sheet 33 in the same way that the spot 9 scans the transparency 1 and consequently the sheet 33 is exposed element by element.

We have already drawn attention to the difference in the forms of modulation present in the beam which reaches the light-sensitive sheet. The modulation of the light by the output signal from the correction computer appears as a time-modulation of the beam as a whole, while the effect of the screen loop is to introduce a spatial modulation varying over the cross-section of the beam. The intensity modulation derived from the computer output combines with the spatial density variations on the screen sample, ultimately to produce the required dot "percentages" in the developed image.

The screen loop is driven by the phase-locked motor 29 so that its peripheral speed is equal to that of the drum 2 carrying the sheet 33 divided by the magnification of the exposing lens. The width of the aperture is set to correspond to the section of the screen pattern. The lens 30 is a zoom lens which enables fine adjustment of the line width. The screen sample is selected in accordance with the required screen angle, and the aperture width, traverse rate and phasing of adjacent scanning lines are set in accordance with the screen angle.

Figure 2:
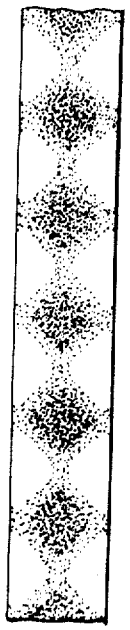
FIGS. 2 and 3 illustrate screen elements of the kind used for the screen loop shown in FIG. 1.
Figure 3:
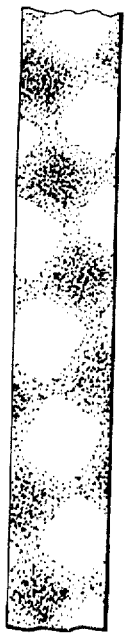

FIGS. 2 and 3 illustrate the form of the screen element, FIG. 2 representing a screen element at 0° and FIG. 3 a screen element at an angle of arc tan ¼. The screen element of FIG. 3 is a simple example of a screen angle other than 0°. Its angle is approximately 15° but is not close enough for printing at the conventional 15° screen angle, for which it is preferable to use a screen element at an angle of arc tan $15/16$, or an even closer approximation to 15°. The strip shown in FIG. 2 cannot be further longitudinally divided because it is essential to find corresponding points in the dot pattern on both edges of the strip. The strip shown in FIG. 3 can be further sub-divided; for example, it can be divided into four similar strips of equal width and in each strip corresponding points in the dot pattern will be found on both edges. The example shown in FIG. 3 is the widest strip which would normally be chosen at this screen angle to maintain picture resolution.

Figure 4:
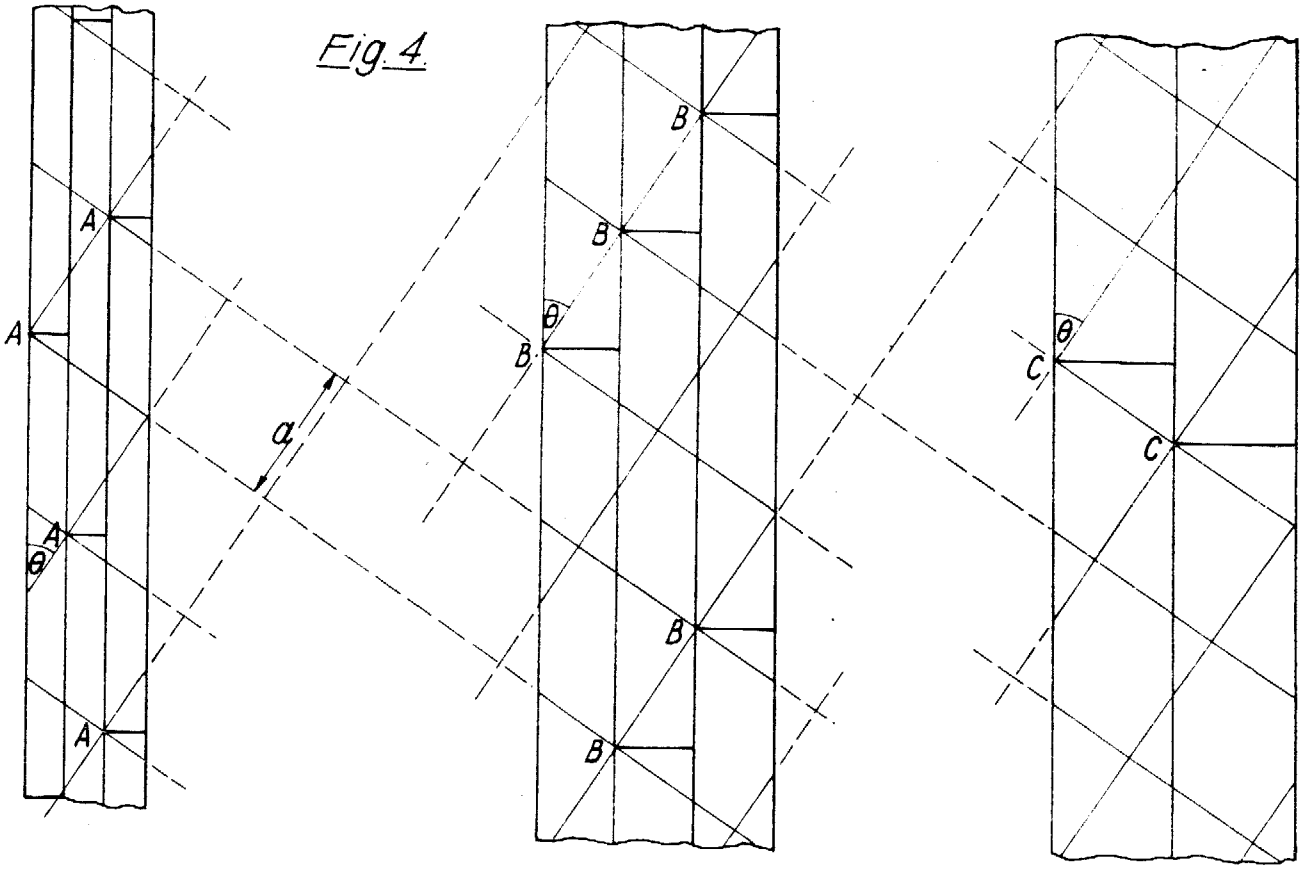
FIG. 4 illustrates the possible strip widths for a given screen angle.

FIG. 4 shows a series of strips of different widths for a screen having an angle $\theta$=arc tan ⅔. This angle is not a conventional screen angle but is useful for demonstration purposes. The diagonal lines indicate the screen rulings and the points at which the lines cross one another are corresponding points in the dot pattern, for example dot centers. Three possible strip widths are shown, with points A, B and C as sets of corresponding points in the dot pattern; the distances between successive points A, B or C on a single strip represents the repeating length and the strip area enclosed between these points constitutes a unit cell. The displacement of adjacent strips in the direction of their length indicates the required phase delay between successive scanning lines.

If $\theta$=the angle between the screen ruling and the strip edge and tan $\theta$=P/Q where P, Q are integers with no common factors when the possible strip widths are N/Q(a cos $\theta$) where a=dot spacing (a square grid is assumed) and N=1, 2, 3 . . . .

If tan $\theta$ is irrational then any strip width is possible. In practice the screen is of finite size and it is required to simulate it on a rotating drum. If the restriction is made that tan $\theta$ is rational then the strips are seen to consist of identical repeating lengths, and the basic $$\text{length}=a\sqrt{P^2+Q^2}.$$

If the required phase delay is small in relation to the strip length (for example less than 1,000th of the strip length), then the speed of rotation of the sample can be changed slightly (relatively to that of the drum) to achieve this phase delay, the resulting distortion in dot shape would not be significant.

Another way of achieving the phase delay is to select the ratio between strip length and cylinder circumference so that adjacent scanning lines begin on the correct part of the pattern. For example, if the screen angle is 45°, the required phase delay between adjacent scanning lines is one half of the repeating length. This phase delay can be achieved by making the screen loop with an odd number of repeating lengths in its circumference and arranging for the loop to rotate, for example, one and a half times for each rotation of the drum. This assumes a magnification of one between the loop and the drum. Then if there are 707 repeating lengths in the loop, the number of repeating lengths exposed on to the drum in 1 revolution of the latter is 1060½. Appropriate choice of the ratio of strip length to drum circumference would enable correct phase delays to be obtained for other screen angles.

Figure 5:
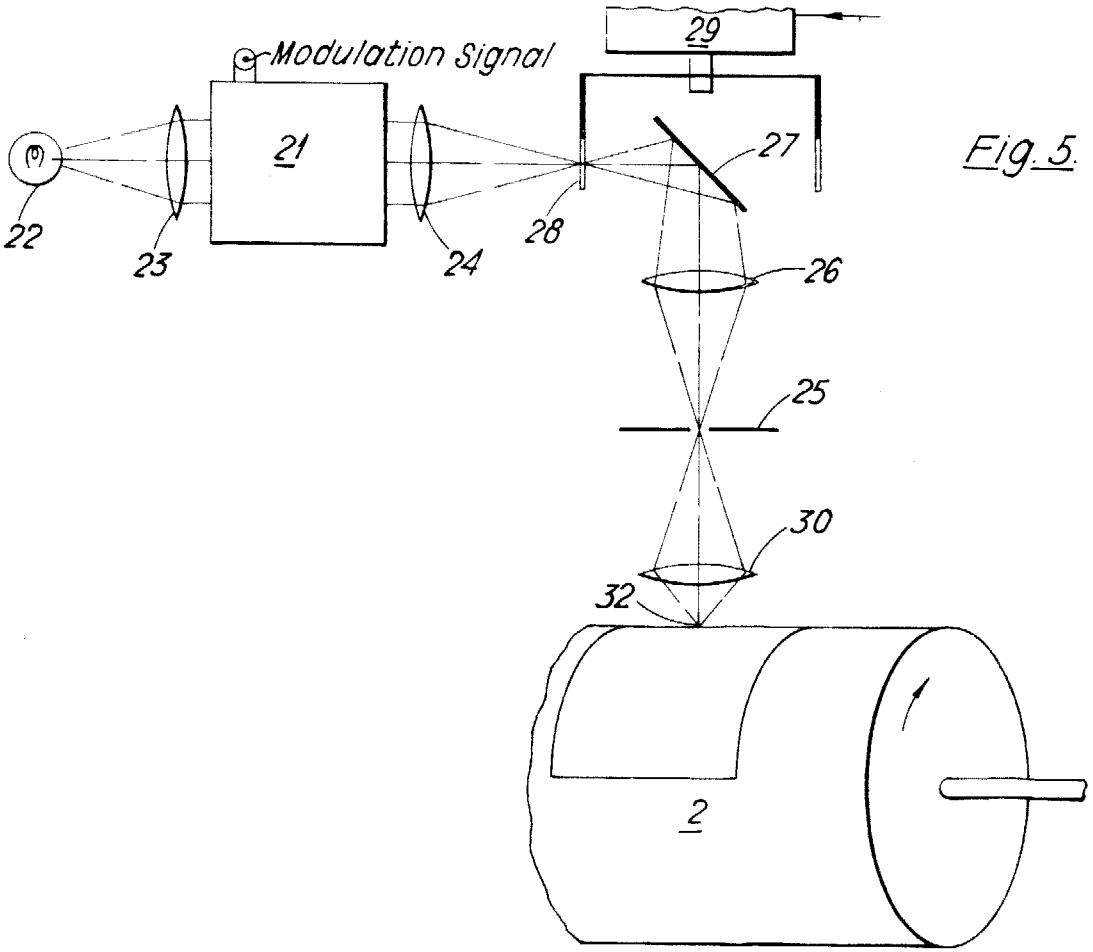
FIG. 5 illustrates the optical system of a second image-reproducing apparatus embodying the invention.

FIG. 5 shows a modification of the optical system in which the screen loop is interposed in the light path at a different conjugate point, before the light beam reaches the aperture 15, the point being so chosen that an image of the screen element through which the light beam passes is formed at the aperture 15.

It will be appreciated that the invention is not confined to application to scanners of the rotating drum type. It can also be applied to other kinds of scanners, for example the "traversing table" scanner; it is of course then necessary to match the speed of traverse of the table to the peripheral speed of the loop. In addition the invention can be applied to any screen having a repeating pattern, for example to screens having dot shapes other than circular and to screens in which the dot axes are not mutually perpendicular. An enlarging scanner can be used in place of the scanner shown, and the scanner may also be of the kind suitable for color reproduction. An enlarging color scanner is described in detail in our British Patent Specification No. 1,166,091.

The separate analyzing and reproducing light source may be replaced by a single light source, used either with the exposing head of the analyzing head, and with a light guide to convey light to the other of the two heads.

It would be possible to use a disc carrying the screen elements around a marginal track, in place of the loop of screen element shown and described.

It would also be possible to make the screen element move across the aperture itself but this requires the screen loop to be located very close to the aperture and is more difficult to put into practice.

I claim:

1. In image-reproduction apparatus including a light source, an optical system for deriving a light spot from said light source, means for obtaining relative motion between a light-sensitive sheet placed in the apparatus and the light spot derived from the light source, so that in an exposure operation the sheet is exposed element by element to the light spot, and means for modulating the light spot in accordance with tonal values of successively scanned elements of an image to be reproduced on the light-sensitive sheet, the improvement comprising a light-transmitting half-tone screen element, means for moving said screen elements through the light path between the light source and the light-sensitive sheet at a point in the light path conjugate with the light spot on the light-sensitive sheet, so that an image of the moving screen element is formed by the light spot at the light-sensitive surface, each portion of said screen element passing repeatedly through the light path during said exposure operation, and means synchronizing the movement of the screen element through the light path with the movement of the light spot over the light-sensitive sheet.

2. Apparatus in accordance with claim 1, in which the screen element moves across the aerial image of an aperture in the optical system.

3. Apparatus in accordance with claim 1, in which an aerial image of the half-tone screen moves across an aperture in the optical system.

4. Apparatus in accordance with claim 1, in which the light-transmitting half-tone screen element is in the form of a loop of film having an integral number of screen elements along its length and which is driven at a rate related to the speed of the said relative motion.

5. Apparatus in accordance with claim 1, further comprising a drum around which the light-sensitive sheet to be exposed is wrapped, means for rotating the drum to provide relative motion between the light spot and the said sheet to provide line scanning of the sheet, and means for obtaining relative axial movement of the drum and the light source to provide frame scanning of the sheet.

References Cited

The following references, cited by the Examiner, are of record in the patented file of this patent or the original patent.

UNITED STATES PATENTS

| | | | |
|---|---|---|---|
| 2,282,337 | 5/1942 | Mies. | |
| 3,461,229 | 8/1969 | Oppenheimer | 96—45 |

JOHN M. HORAN, Primary Examiner

U.S. Cl. X.R.

95—36, 45